(12) United States Patent
Cordero

(10) Patent No.: US 10,850,783 B2
(45) Date of Patent: Dec. 1, 2020

(54) FOLDABLE ELECTRIC SCOOTER AND MANUFACTURE METHOD OF THE SAME

(71) Applicants: Terrell Antonio Bolden, Pomona, CA (US); Armando Luis Cordero, Riverside, CA (US)

(72) Inventor: Armando Luis Cordero, Riverside, CA (US)

(73) Assignee: Armando Luis Cordero, Riverside, CA (US)

( * ) Notice: Subject to any disclaimer, the term of this patent is extended or adjusted under 35 U.S.C. 154(b) by 138 days.

(21) Appl. No.: 15/716,480

(22) Filed: Sep. 26, 2017

(65) Prior Publication Data

US 2018/0086400 A1 Mar. 29, 2018

Related U.S. Application Data

(60) Provisional application No. 62/400,095, filed on Sep. 27, 2016.

(51) Int. Cl.
| | |
|---|---|
| *B62K 15/00* | (2006.01) |
| *B62D 61/02* | (2006.01) |
| *B62K 3/00* | (2006.01) |
| *B62K 25/16* | (2006.01) |
| *B62K 25/20* | (2006.01) |
| *B60L 50/52* | (2019.01) |
| *B62M 9/02* | (2006.01) |

(Continued)

(52) U.S. Cl.
CPC .............. *B62D 61/02* (2013.01); *B60L 50/52* (2019.02); *B62K 3/002* (2013.01); *B62K 15/008* (2013.01); *B62K 25/16* (2013.01); *B62K 25/20* (2013.01); *B60L 2200/22* (2013.01); *B60L 2220/44* (2013.01); *B60L 2220/46* (2013.01); *B62K 19/08* (2013.01); *B62K 2202/00* (2013.01); *B62K 2204/00* (2013.01); *B62M 9/02* (2013.01); *B62M 11/02* (2013.01); *Y02T 10/7005* (2013.01)

(58) Field of Classification Search
CPC ........................... B62K 15/006; B62K 15/008
See application file for complete search history.

(56) References Cited

U.S. PATENT DOCUMENTS

| | | | |
|---|---|---|---|
| 2003/0160365 A1* | 8/2003 | Brown .................... | B29C 39/10 264/553 |
| 2006/0163837 A1* | 7/2006 | Sutherland ........... | B62K 15/006 280/284 |

(Continued)

*Primary Examiner* — James A English
(74) *Attorney, Agent, or Firm* — Bayramoglu Law Offices LLC

(57) ABSTRACT

The present application relates to the field of electric scooter, and more particularly to a foldable electric scooter and a manufacture method of the same. Electric scooter 10 includes front wheel assembly 20, front fork assembly 30, headset assembly 50, handlebar assembly 60, throttle controller 70, gooseneck assembly 80, main body assembly 90, standing platform 100, drive train assembly 110, and rear wheel assembly 120. One purpose of the present application is to provide an electric scooter that has a flexible design, whose rear tire revolves inwardly and handlebar assembly collapses to minimize the whole volume of the electric scooter for facilitating transportation and storage. Another purpose of the present invention is to provide a method of manufacturing the electric scooter.

7 Claims, 32 Drawing Sheets

(51) Int. Cl.
  *B62M 11/02* (2006.01)
  *B62K 19/08* (2006.01)

(56) References Cited

U.S. PATENT DOCUMENTS

| | | | | |
|---|---|---|---|---|
| 2014/0008882 A1* | 1/2014 | Liao | ............... | B62K 3/002 |
| | | | | 280/40 |
| 2015/0321722 A1* | 11/2015 | Dadoosh | ............... | B62K 3/002 |
| | | | | 180/208 |
| 2018/0269455 A1* | 9/2018 | Fernandez-Galindo | ............... | |
| | | | | H01M 2/206 |

* cited by examiner

FOLDABLE ELECTRIC SCOOTER AND MANUFACTURE METHOD OF THE SAME

TECHNICAL FIELD

The present application relates to the field of electric scooter, and more particularly to a foldable electric scooter and a manufacture method of the same.

BACKGROUND

In daily life, people can drive to the office or the classroom, but there is a problem of "last mile commuting". Such short-distance commuting like walking usually takes an excessive amount of time. Available transportation options are (either manual or electronic) bikes, scooters, skateboards, etc. However, none of these options possess the lightness of weight, ease of use, and compactness desired by the user at the same time.

An electric scooter is a good choice for the user. However, some defects exist along with electric scooters available on today's market. Most traditional recreational motorized scooters are relatively large and require heavy hub motors to propel the scooter. Besides, the existing scooter cannot be folded into the size and weight which is easy to carry. This flaw results from its manufacturing method. Traditional scooters typically use bent tubes welded together. Another option is the extrusion equipment. However, those existing manufacture methods require skilled laborers and large initial investment.

The direct extrusion process is the most common manufacturing method of scooters. However, such method has several defects. For example, the die is expensive to manufacture. Also, Extrusion Machines take up a lot of space and are very expensive. Moreover, limited folding capabilities due to the geometric design of the die is undesired. Extruding metal through a die limits the way the scooter can be folded. Further, the electric scooter manufactured by this method weigh from 23.6 to 34 pounds. Thus, it is inconvenient to carry.

Therefore, there is a need to provide an electric scooter that is light and compact enough to be concealed. Also, a different method of manufacturing the scooter that is capable of folding and weighing less is desired.

SUMMARY

One purpose of the present application is to provide an electric scooter that has a flexible design, whose rear tire revolves inwardly and handlebar assembly collapses to minimize the whole volume of the electric scooter for facilitating transportation and storage.

Another purpose of the present invention is to provide a method of manufacturing the electric scooter.

An electric scooter includes a front wheel assembly, a front fork assembly, a headset assembly, a handlebar assembly, a throttle controller, a gooseneck assembly, a main body assembly, a standing platform, a drive train assembly, a rear fork assembly, a rear wheel assembly, and a power supply. The front wheel assembly is mounted on the front fork assembly. The front fork assembly is connected to the headset assembly pivotably. The handlebar assembly is connected to the headset assembly pivotably. The throttle controller is mounted on the handlebar assembly. The gooseneck assembly is mounted on the headset assembly. The main body assembly is connected to the gooseneck assembly. The standing platform is mounted on the main body assembly. The rear wheel assembly is connected to the main body assembly. The drive train assembly is connected to the rear fork assembly. The rear fork assembly supports the rear wheel assembly. The power supply is attached to the main body assembly.

Furthermore, the front fork assembly is capable of pivoting about a first point towards the gooseneck assembly. The goose neck assembly further includes a cavity accommodating the front wheel assembly. The gooseneck assembly is capable of pivoting about a second point towards the main body assembly along a first direction. The rear wheel assembly is configured to pivot about a third point towards the main body assembly along a second direction. The main body assembly further includes a hollow portion accommodating the rear wheel assembly.

Furthermore, the handlebar assembly further includes a first handle, a second handle, a first segment, and a second segment. The first segment is sleeved into the second segment, such that the first segment is capable of collapsing into the second segment. The first handle and the second handle are provided on the left and right sides of the handlebar assembly respectfully and the first handle and the second handle are capable of collapsing in a first plane. The collapsed second segment is configured to revolve about a central axis for degrees, such that the first handle and the second handle are in a second plane which is perpendicular to the first plane. The collapsed handlebar assembly is configured to pivot sideways towards the gooseneck assembly.

Furthermore, the front wheel assembly further includes a tire, a wheel spacer plate, an inner wheel plate, an outer wheel plate, a wheel bearing, a plurality of hex standoffs, and a plurality of screw fasteners. The wheel spacer plate, the inner wheel plate, and the outer wheel plate are sandwiched together to form a hub. The hub is held in place by the plurality of hex standoffs and the plurality of screw fasteners. The bearing is mounted at a center of the hub. The tire is mounted on the hub. A diameter of the outer wheel plate is larger than a diameter of the inner wheel plate.

Furthermore, material of the wheel spacer plate, the inner wheel plate, and the outer wheel plate is selected from the group consisting of plastic, aluminum, stainless steel, carbon fiber, paper, metal, and ceramics.

Furthermore, the front fork assembly further includes a first front fork plate, a second front plate, a first rocker, a second rocker, a top bridge, a steering tube, an intermediate plate, a first shock, and a second shock. The first rocker is connected to the first front fork plate. The second rocker is connected to the second front fork plate. The steering tube is inserted into and fixed to the top bridge by a threaded standoff. The first rocker and the first shock make up a first fork suspension assembly. The second rocker and the second shock make up a second fork suspension assembly. The intermediate plate is connected between the first shock and the second shock. Each of the first shock and the second shock further includes a shoulder bolt, a nut, a ball joint rod end, a suspension rod, a rebound spring, a rebound spring washer, an intermediate plate washer, a ball joint swivel bearing, a compression spring bushing, a compression spring, a compression spring bridge, and a lock nut. The rebound spring, the rebound spring washer, an intermediate plate washer, the ball joint swivel bearing, the compression spring bushing, and the compression spring are sleeved outside the suspension rod. A first end of the suspension rod is inserted into the ball joint rod end. A second end of the suspension rod is connected to the lock nut. The ball joint rod end is connected to the rocker through the shoulder bolt and the nut.

Furthermore, the headset assembly further includes a top member, a base member, and a connecting member. The top member is configured to fit the handlebar assembly. The connecting member includes a plurality of holes.

Furthermore, the goose neck assembly further includes a first outer plate, a central member, and a second outer plate. The first outer plate, the central member, and the second outer plate are assembled by a plurality of fastener dives.

Furthermore, the main body assembly further includes a first support plate, a front bridge, a pivoting rod, a rear bridge, a second support plate. The first support plate and the second support plate are fixed to the front bridge. The rear bridge is connected between the first support plate and the second support plate. The pivoting rod is connected between the first support plate and the second support plate. The main body assembly is a one-piece flat plate cut out into a predetermined shape. The one-piece flat plate includes a first side portion, a second side portion, a front portion, and a central portion. The first side portion and the second side portion can be folded to be perpendicular to the central portion. The front portion is bent back to be perpendicular to the central portion. The first side portion, the second side portion, and the front portion are welded together to form the main body assembly.

Furthermore, the rear fork assembly further includes a first fork plate, a second fork plate, an intermediate plate, and a pivot rod. The first fork plate and the second fork plate are connected by the intermediate plate. The pivot rod is connected between an inner side of the first fork plate and an inner side of the second fork plate. The first fork plate is configured to hold a braking system.

Furthermore, the braking system is a rear sprocket assembly which includes a disc brake, a sprocket, and a spacer. The disc brake, the sprocket, and the spacer are laminated together to attach to the rear wheel assembly by a plurality of screws.

Furthermore, the braking system is a mechanical brake assembly which includes a first plate, a second plate and a sprocket. The first plate, the second plate, and the sprocket are assembled together by a plurality of screws.

Furthermore, a spring is mounted between the rear fork assembly and the drive train assembly.

Furthermore, the rear drive train assembly further includes a motor, a first sprocket, a second sprocket, a third sprocket, a fourth sprocket, a tire. The motor is connected to the first sprocket. The first sprocket is connected to the second sprocket. The second sprocket is connected to the third sprocket through. The third sprocket is connected to the fourth sprocket. A diameter of the fourth sprocket is larger than a diameter of the third sprocket. A diameter of the second sprocket is larger than a diameter of the first sprocket.

A manufacturing method of an electric scooter includes the following steps: cutting two-dimensional scooter parts; and assembling the two-dimensional scooter parts into a three-dimensional electric scooter.

Furthermore, material of the wheel spacer plate, the inner wheel plate, and the outer wheel plate is selected from the group consisting of plastic, aluminum, stainless steel, carbon fiber, paper, metal, and ceramics.

Furthermore, the step of cutting two-dimensional scooter parts is performed by a water jet.

Furthermore, the step of cutting two-dimensional scooter parts is performed by a Laser cutter.

Furthermore, the water jet uses an ultra-high water pressure of 30,000 to 90,000 psi.

Furthermore, two-dimensional scooter parts are nesting in one piece of flat raw material. Nesting refers to the process of laying out cutting patterns to minimize the raw material waste.

The electric scooter of the present application is beneficial to those who are looking for a comfortable and easy ride experiences in different respects, such as wide standing platform, front and rear suspension, drive transmission for increased torque, neutral for coasting down hills without engaging the motor.

The electric scooter of the present application has a unique folding design which allows it to take up a substantially less amount of surface area than traditional scooters.

The electric scooter of the present application is able to fit completely inside of a backpack, staying compact when put away.

When compressed the electric scooter of the present application, it is convenient to store and can be moved easily. The electric scooter is capable of higher speeds due to the smaller size and the lightweight brushless electric motor. the electric scooter of the present application has a flexible design which permits it to be carried around while exhibiting the form and function of other existing electric scooters.

The electric scooter of the present application may be folded into each other creating less surface area than prior scooters. Meanwhile, the electric scooter of the present application retains the unfolded dimensions of prior scooters. Thus, the electric scooter of the present application is competitive in the market.

DETAILED DESCRIPTION

Hereinafter this invention will be further described in conjunction with the accompanying figures and embodiments.

Figure 1:
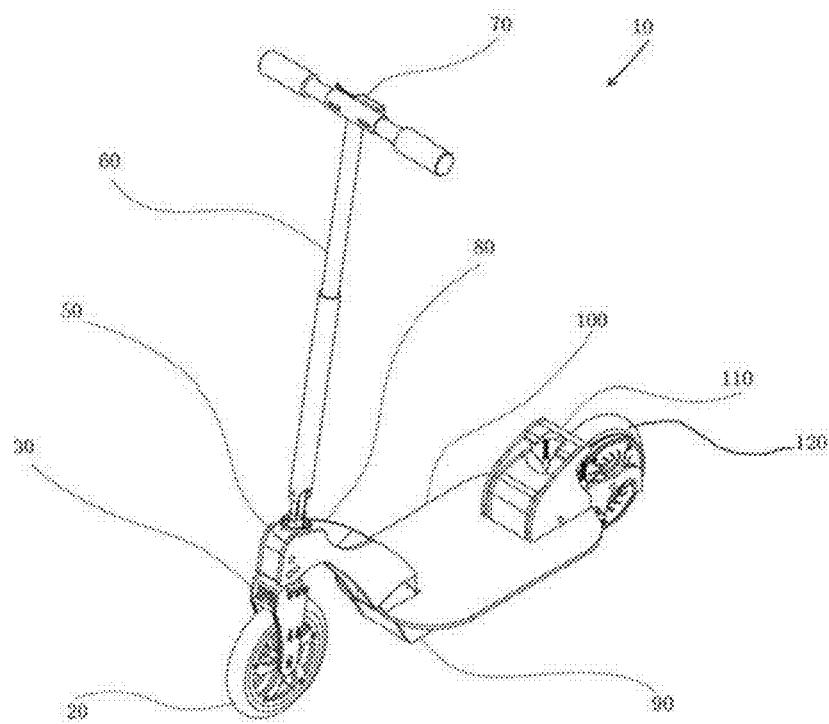
FIG. 1 is a perspective view of the electric scooter according to one embodiment of the present invention.

FIG. 1 shows electric scooter 10 of one embodiment of the present invention. As shown in FIG. 1, electric scooter 10 which is in a completely open state, includes front wheel assembly 20, front fork assembly 30, headset assembly 50, handlebar assembly 60, throttle controller 70, gooseneck assembly 80, main body assembly 90, standing platform 100, drive train assembly 110, and rear wheel assembly 120.

Figure 2:
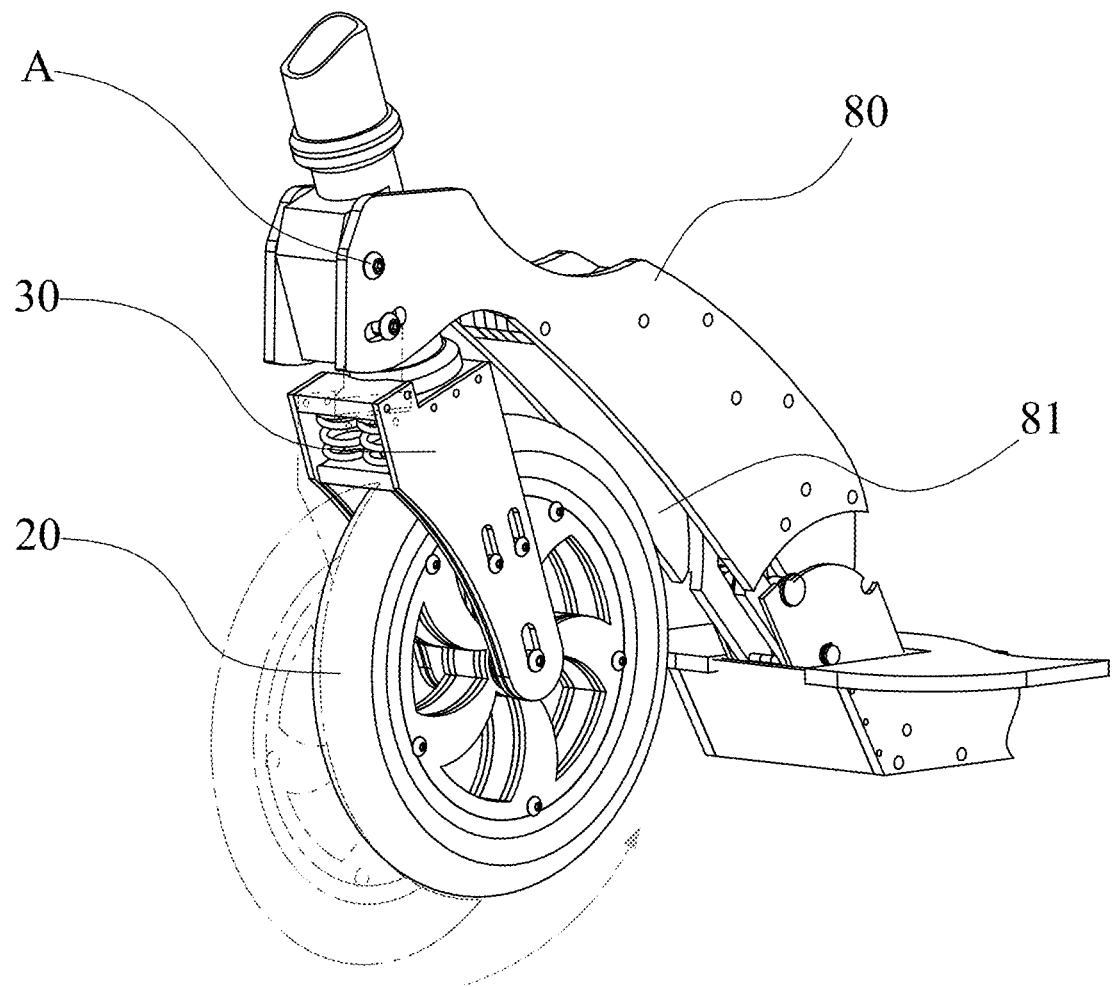
FIG. 2 is a fragmentary side view of the electric scooter according to one embodiment of the present invention wherein the front wheel assembly is folding into the goose neck assembly.

As shown in FIG. 2, front fork assembly 30 can pivot about Point A towards gooseneck assembly 80. There is a cavity 81 in goose neck assembly 80 which allows front wheel assembly 20 to be tucked into gooseneck assembly 80 to achieve a better compaction. Without the cavity in gooseneck assembly 80, front wheel assembly 20 cannot fold into gooseneck assembly 80.

Figure 3:
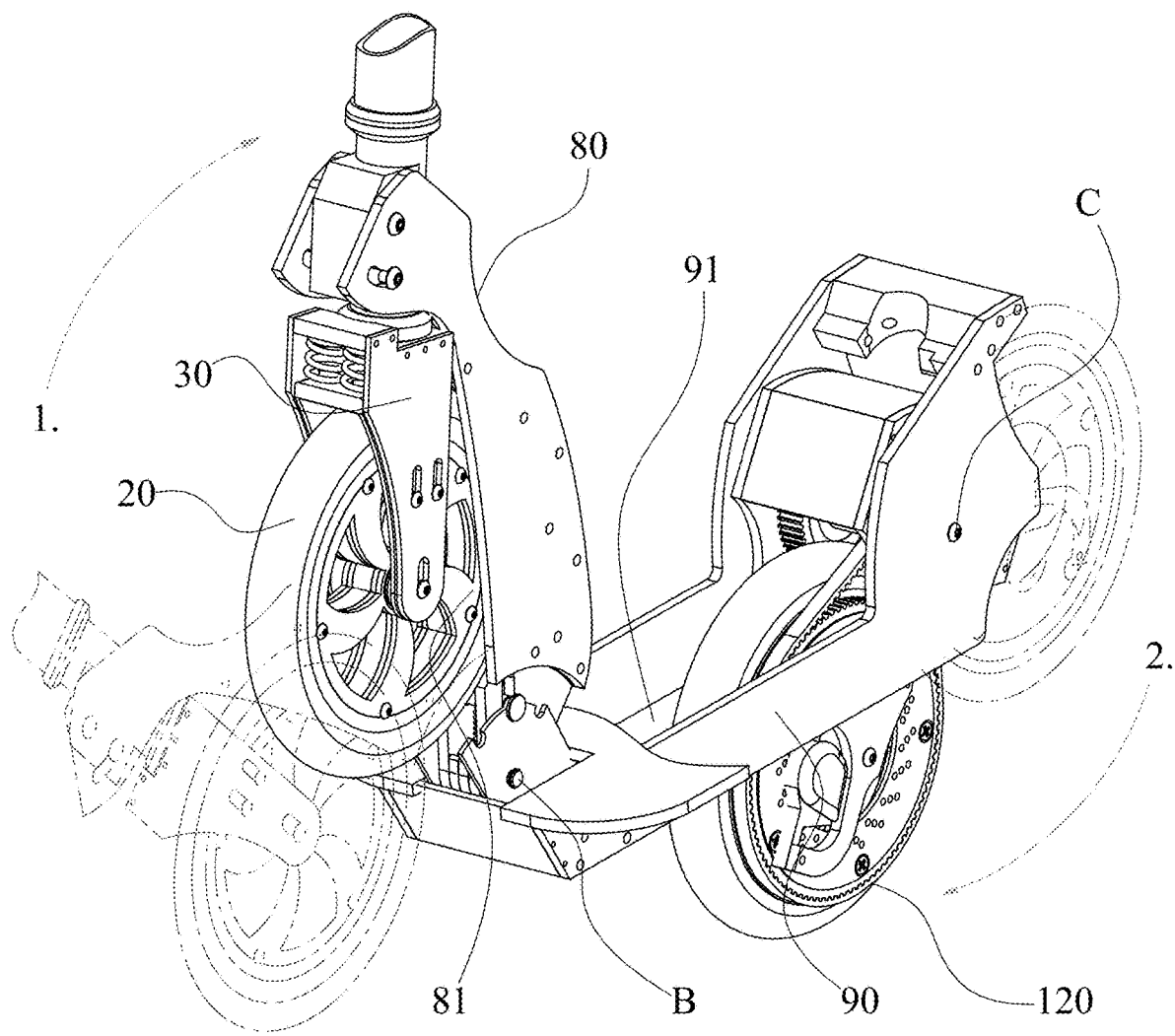
FIG. 3 is a fragmentary side view of the electric scooter according to one embodiment of the present invention wherein the goose neck assembly is folding towards the main body assembly.

As shown in FIG. 3, gooseneck assembly 80 can pivot about Point B towards main body assembly 90 along direction 1. Rear wheel assembly 120 can pivot about Point C towards main body assembly 90 along direction 2. There is a hollow portion 91 in main body assembly 90 into which rear wheel assembly 120 can fit.

FIG. 4A~FIG. 4G show how handlebar assembly 60 is folded step by step.

Figure 4A:
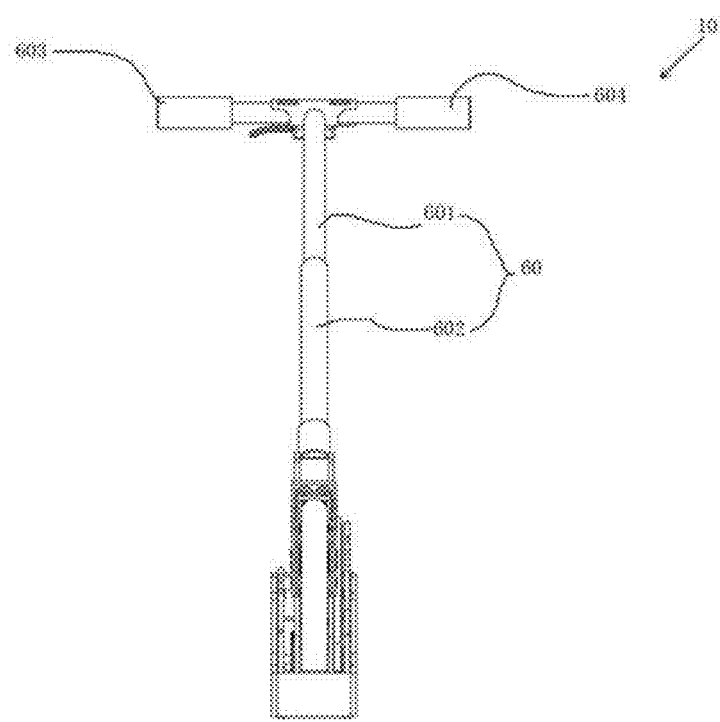
FIG. 4A is a front view of the of the electric scooter according to one embodiment of the present invention.

FIG. 4A shows the front view of scooter 10, wherein handlebar assembly 60 is in an open state. Handlebar assembly 60 includes first handle 603, second handle 604, first segment 601, and second segment 602.

Figure 4B:
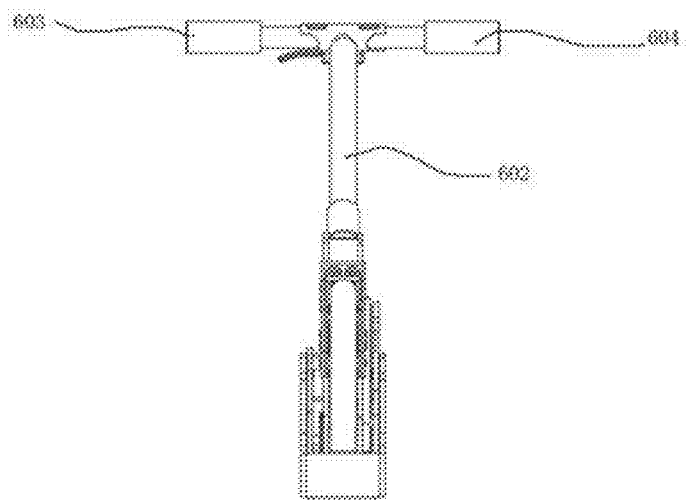
FIG. 4B is another front view of the of the electric scooter according to one embodiment of the present invention.

As shown in FIG. 4B, first segment 601 is collapsed into second segment 602. At the same time, first handle 603 and second handle 604 are in the open state.

Figure 4C:
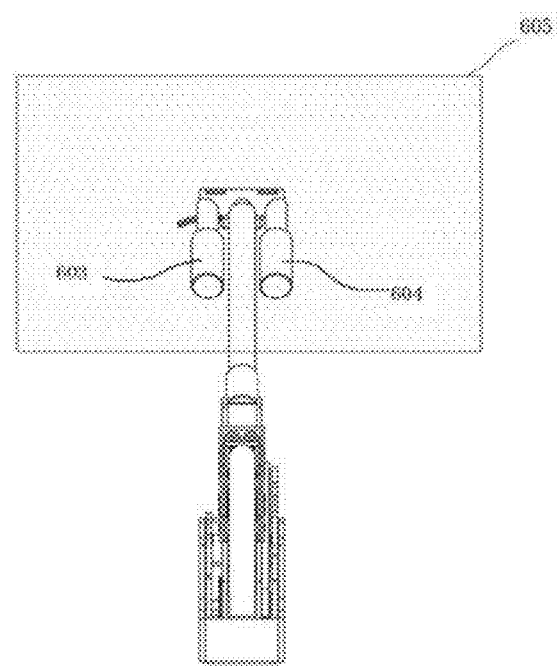
FIG. 4C is yet another front view of the of the electric scooter according to one embodiment of the present invention.

As shown in FIG. 4C, first handle 603 and second handle 604 are collapsed. first handle 603 and second handle 604 are in the same plane, which is denoted as plane 605.

Figure 4D:
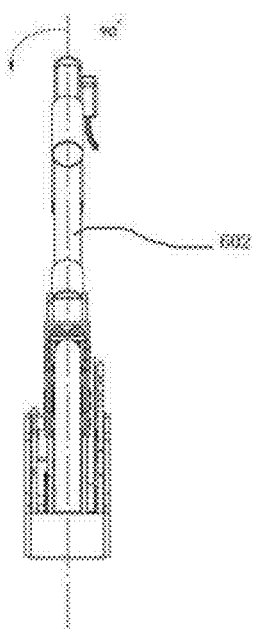
FIG. 4D is still another front view of the of the electric scooter according to one embodiment of the present invention.

As shown in FIG. 4D, collapsed second segment 602 revolves about its central axis for 90 degrees. First handle 603 and second handle 604 are in plane 606 which is perpendicular to plane 605.

Figure 4E:
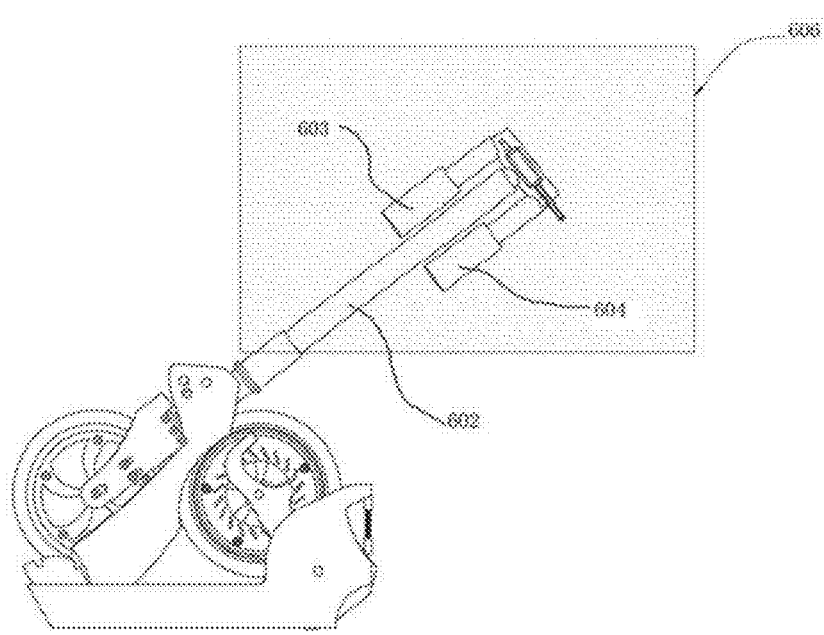
FIG. 4E is a side view of the of the electric scooter according to one embodiment of the present invention.
Figure 8A:
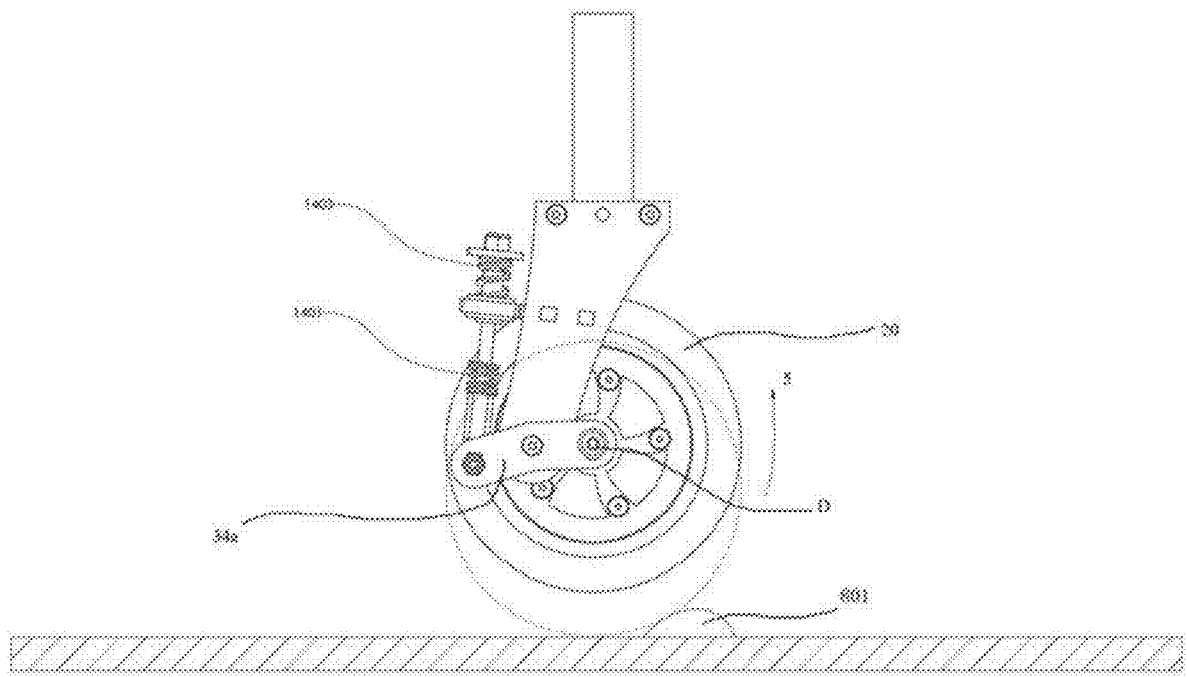
FIG. 8A is a side view of the front wheel assembly illustrating how it reacts to the bump on the road.

FIG. 4E shows the side view of the scooter of FIG. 8A. As shown in FIG. 4E, first handle 603 and second handle 604 are in plane 606 which is perpendicular to plane 605.

Figure 4F:
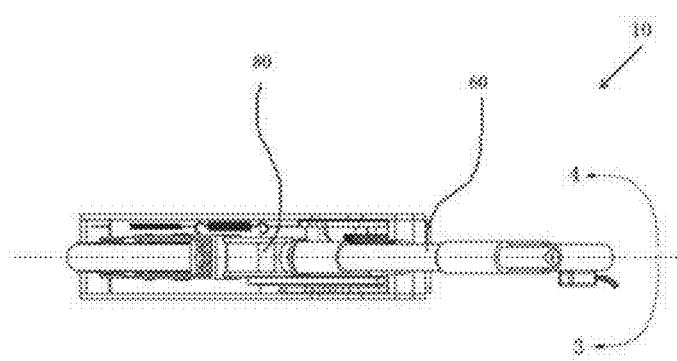
FIG. 4F is a top view of the of the electric scooter according to one embodiment of the present invention.

FIG. 4F shows a top view of the scooter. Collapsed handlebar assembly 60 can pivot sideways towards gooseneck assembly 80 along direction 3 or direction 4.

Figure 4G:
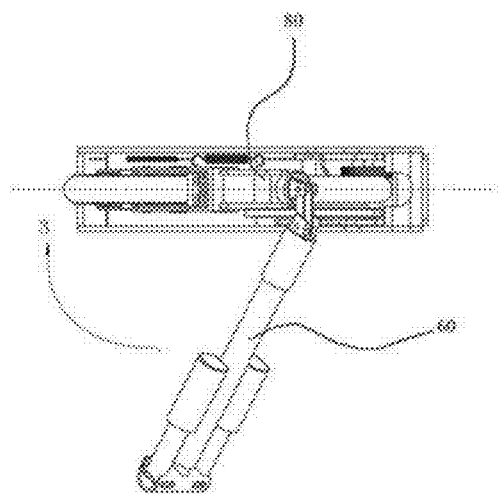
FIG. 4G is another top view of the of the electric scooter according to one embodiment of the present invention.

As shown in FIG. 4G, collapsed handlebar assembly 60 pivots sideways towards gooseneck assembly 80 along direction 3. In FIG. 4G, collapsed handlebar assembly 60 is in the middle during its pivoting motion along direction 3.

Figure 5A:
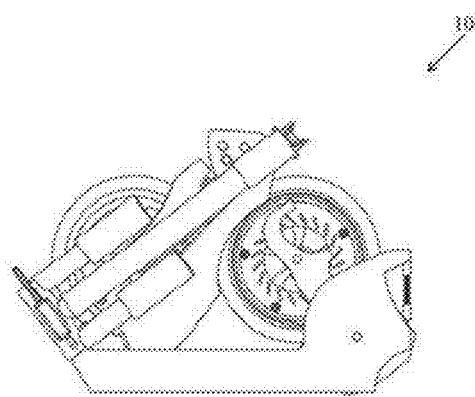
FIG. 5A a side view of the of the electric scooter according to one embodiment of the present invention wherein the scooter is in a completed folded state.

FIG. 5A shows a side view of scooter 10 which is in a completed folded state.

Figure 5B:
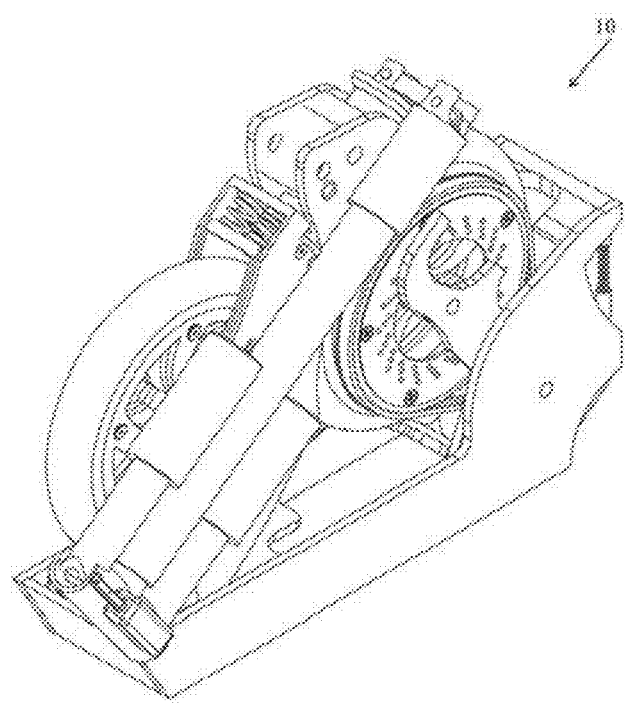
FIG. 5B a perspective view of the of the electric scooter according to one embodiment of the present invention wherein the scooter is in a completed folded state.

FIG. 5B shows an isometric view of scooter 10 which is in a completed folded state.

Figure 6A:
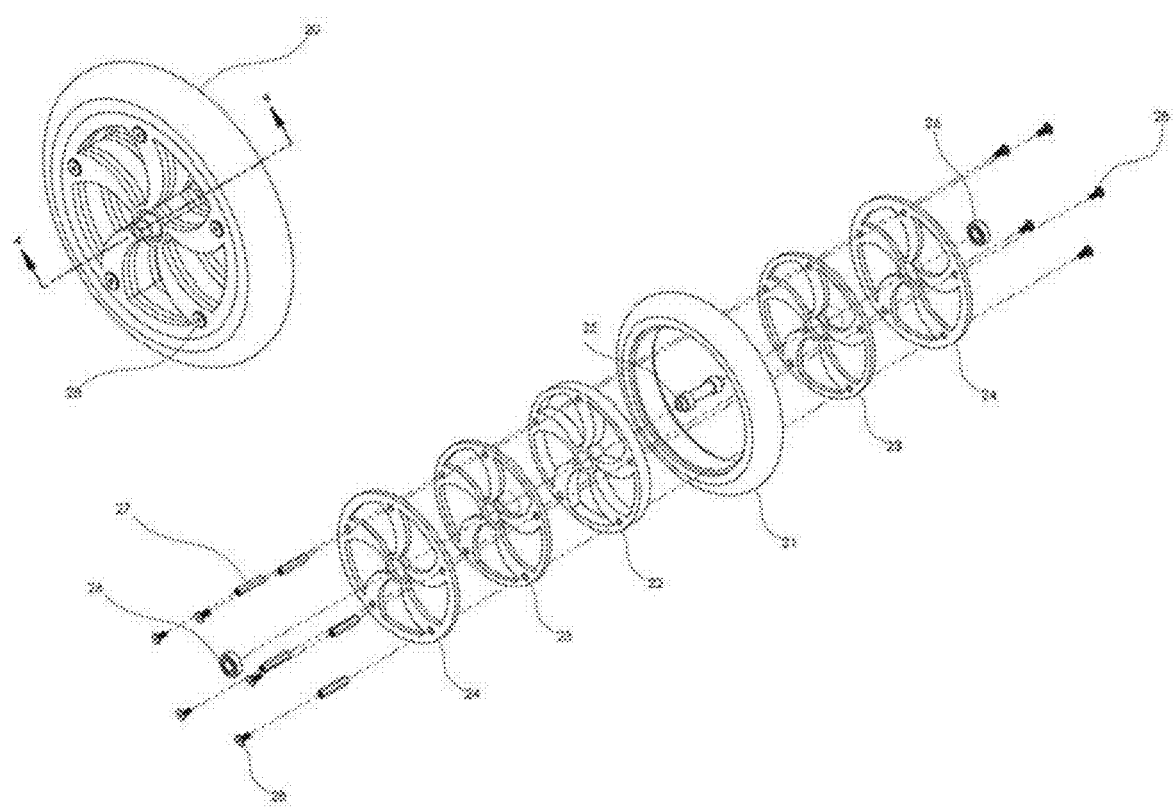
FIG. 6A is an exploded view of the front wheel assembly.

As shown in FIG. 6A, front wheel assembly 20 includes tire 21, wheel spacer plate 22, inner wheel plates 23, outer wheel plates 24, wheel bearings 26, hex standoffs 27, and screw fasteners 28. Wheel spacer plate 22, inner wheel plates 23, outer wheel plates 24 are sandwiched together and held in place by hex standoffs 27 and screw fasteners 28. Diameters of wheel spacer plate 22, inner wheel plates 23, outer wheel plates 24 can be designed according to actual needs. Preferably, the diameter of outer wheel plates 24 is larger than that of inner wheel plate 23.

Figure 6B:
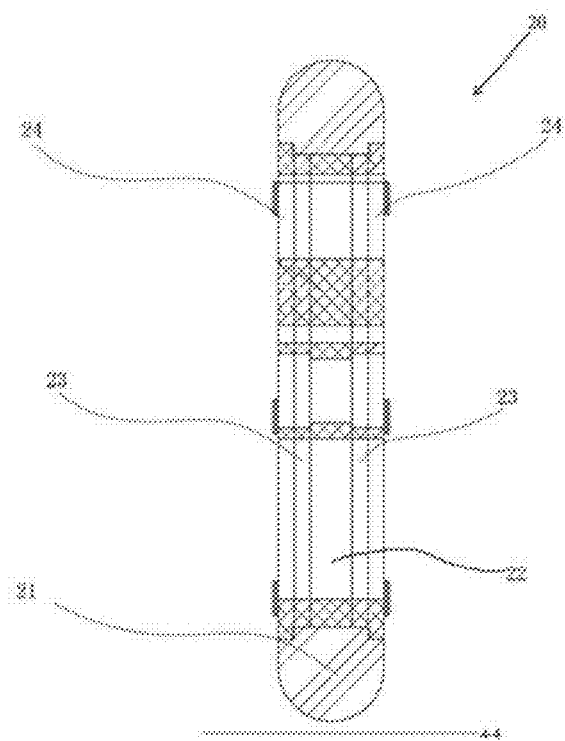
FIG. 6B is a sectional view of the front wheel assembly taken along the line 4-4' in FIG. 6A.

FIG. 6B is a sectional view of front wheel assembly 20 along line 4-4 in FIG. 6A. Inner wheel plates 23 are made of aluminum sheets. Outer wheel plates 24 are made of aluminum sheets. Wheel spacer plate 22 is made of plastic. Preferably, 6061 T6 Aluminum is used in the electric scooter. Its light weight to strength ratio makes 6061 T6 the ideal choice for manufacturers. T6 means that the material has been tempered which makes the aluminum tougher and more shock resistant. Preferably, polyurethane plastic is used to make the wheel spacer plate where strength is not so important. Therefore, the front wheel assembly is light in weight and still has a high strength. As a result, the electric scooter will be lighter than any prior scooter. The materials are not limited thereto. Any material that is suitable can be used, stainless steel, carbon fiber, paper, metal, ceramics, etc.

Figure 7A:
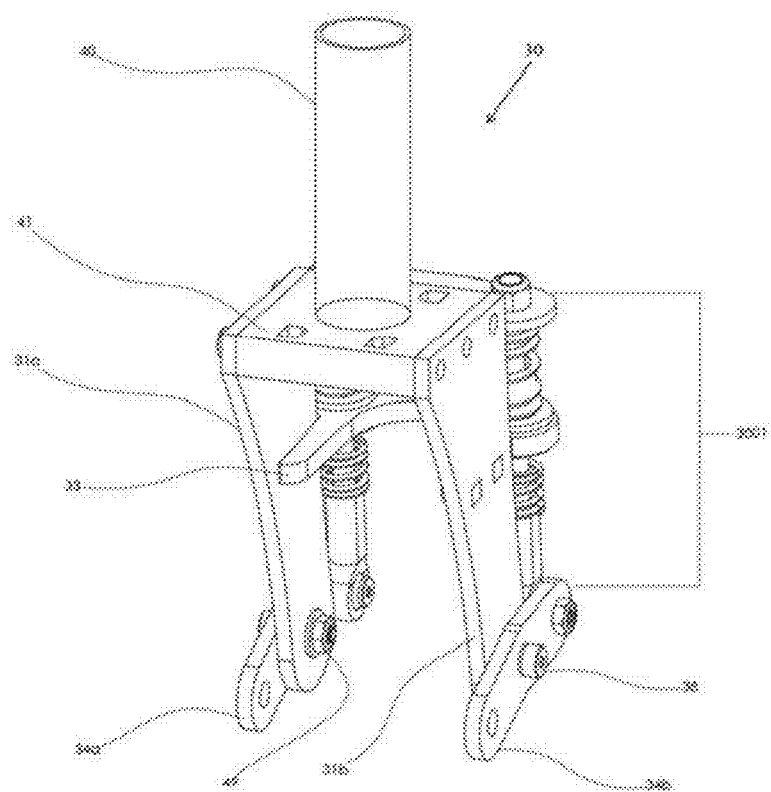
FIG. 7A is a perspective view of the front fork assembly.
Figure 7B:
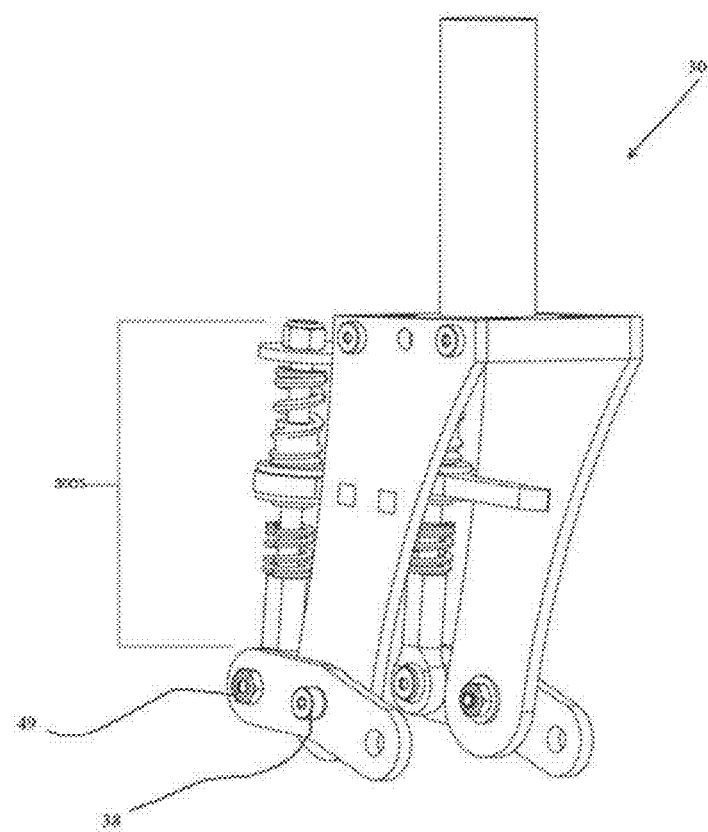
FIG. 7B is another perspective view of the front fork assembly.

As shown in FIG. 7A and FIG. 7B, front fork assembly 30 includes first front fork plate 31a, second front plate 31b, first rocker 34a, second rocker 34b, top bridge 41, steering tube 40, intermediate plate 33, first shock 3001, and second shock 3003. First rocker 34a is connected to first front fork plate 31a, and second rocker 34b is connected to second front fork plate 31b by fasteners 38 and nuts 49.

Figure 7C:
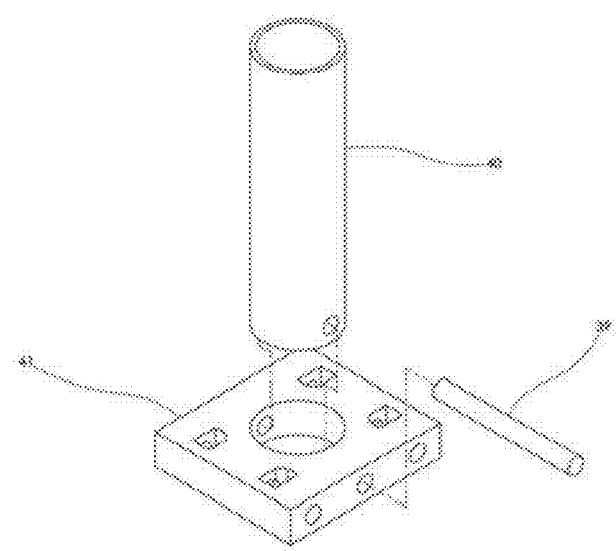
FIG. 7C is an exploded view of the upper portion of the front fork assembly.

FIG. 7C is an exploded view of the upper portion of the front fork assembly. As shown in FIG. 7C, steering tube 40 can be inserted into top bridge 41. Then, female threaded standoff 39 can be inserted into top bridge 41 and steering tube 40 through holes.

Figure 7D:
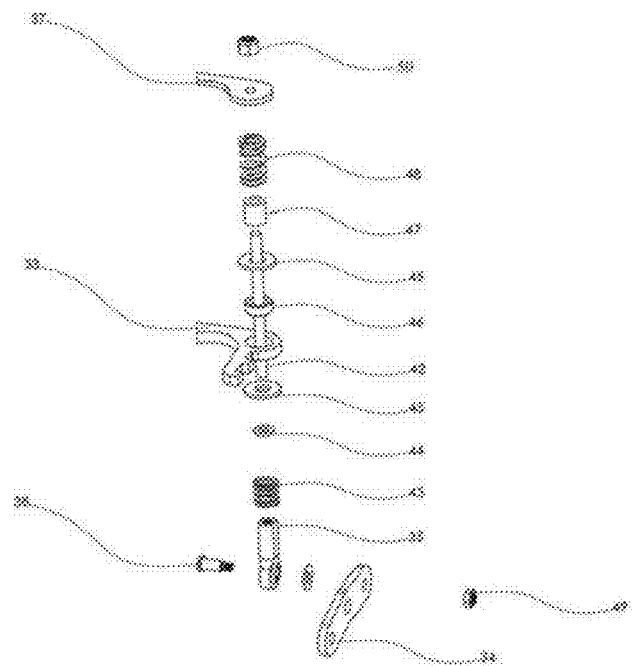
FIG. 7D is an exploded view of the front fork suspension assembly.

One rocker and one shock can make up a front fork suspension assembly. For example, rocker 34a and shock 3003 make up one fork suspension assembly, and rocker 34b and shock 3001 make up another fork suspension assembly. As shown in FIG. 7D, front fork suspension assembly includes rocker arm 34, shoulder bolt 38, nut 49, ball joint rod end 35, suspension rod 42, rebound spring 43, rebound spring washer 44, intermediate plate washer 45, ball joint swivel bearing 46, compression spring bushing 47, compression spring 48, compression spring bridge 37, and lock nut 49.

Figure 8B:
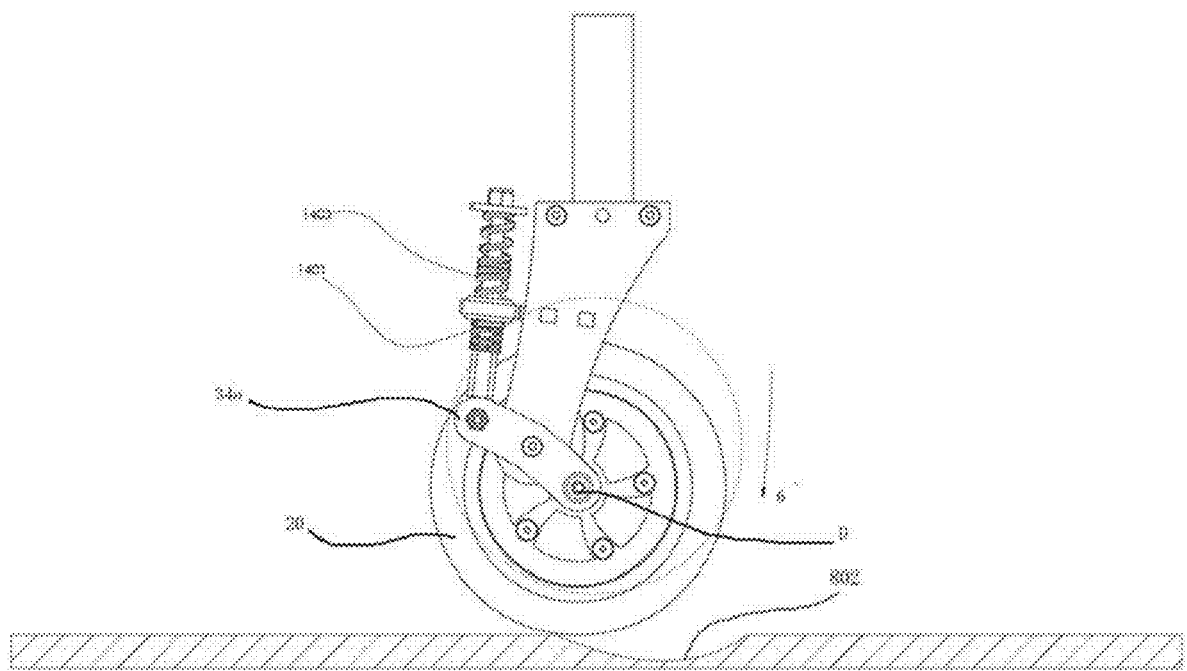
FIG. 8B is a side view of the front wheel assembly illustrating how it reacts to the pit on the road.

FIG. 8A and FIG. 8B show how the fork suspension assembly smooths the bouncing the traveling when the scooter is on a bumpy road.

As shown in FIG. 8A, there is a bump 801 on the ground in the way of the scooter. The original position of front wheel assembly 20 is shown in dashed lines. As the tire hits bump 801, the tire goes up in direction 5. Roker 34a pivots about Point D. First rebound spring 1401 is extended while second rebound spring 1403 is compressed. As such, the roughness of the road is absorbed by the front fork suspension assembly.

As shown in FIG. 8B, there is pit 802 on the ground in the way of the scooter. The original position of front wheel assembly 20 is shown in dashed lines. As front wheel assembly 20 reaches pit 802, it will fall down into the cavity. The tire goes down in direction 6. Rocker 34a pivots about Point D. First spring 1401 is compressed, while second rebound spring 1403 is extended. As such, the roughness of the road is absorbed by the front fork suspension assembly.

Figure 9:
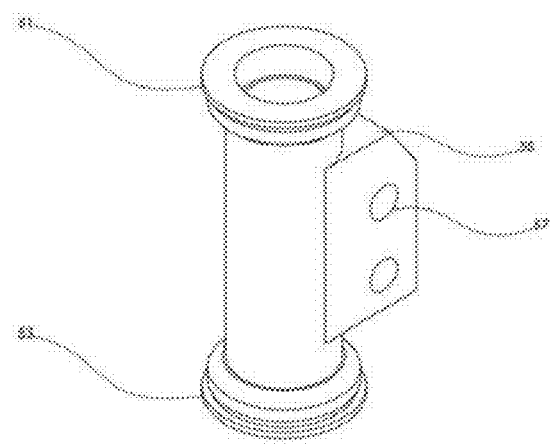
FIG. 9 is a perspective view of the headset assembly.

As shown in FIG. 9, headset assembly 50 includes top member 51, base member 53, and connecting member 55. Top member 51 includes a bearing (not shown). Connecting member 55 can be used to connect steering tube (not shown) of handlebar assembly 60 to gooseneck assembly 80. Connecting member 55 includes holes 57 for pins (not shown) to go through so as to fix headset assembly 50 in place.

Figure 10:
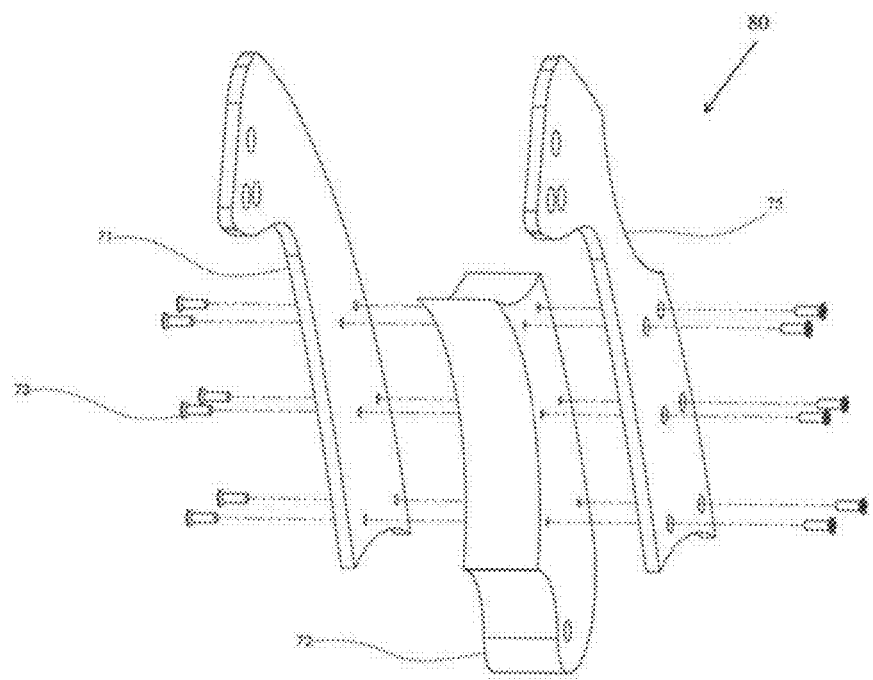
FIG. 10 is an exploded view of the goose neck assembly.

As shown in FIG. 10, goose neck assembly 80 includes the first outer plate 71, central member 72, and second outer plate 75. First outer plate 71, central member 72, and second outer plate 75 are assembled using fastener dive 73.

Figure 11A:
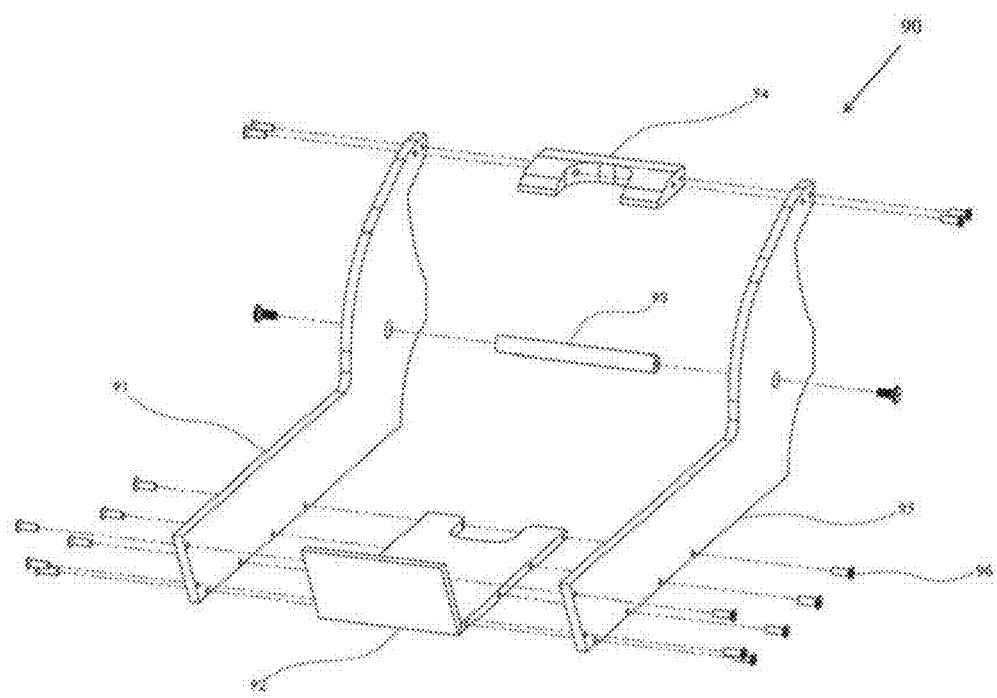
FIG. 11A is an exploded view of the main body assembly according to one embodiment.

As shown in FIG. 11A, main body assembly 90 includes first support plate 91, front bridge 92, pivoting rod 93, rear bridge 94, second support plate 95. First support plate 91 and second support plate 95 are fastened to front bridge 92, rear bridge 94, and pivoting rod 93 with fasteners screws 96. Alternatively, first support plate 91 and second support plate 95 can be welded to front bridge 92, rear bridge 94, and pivoting rod 93.

Figure 11B:
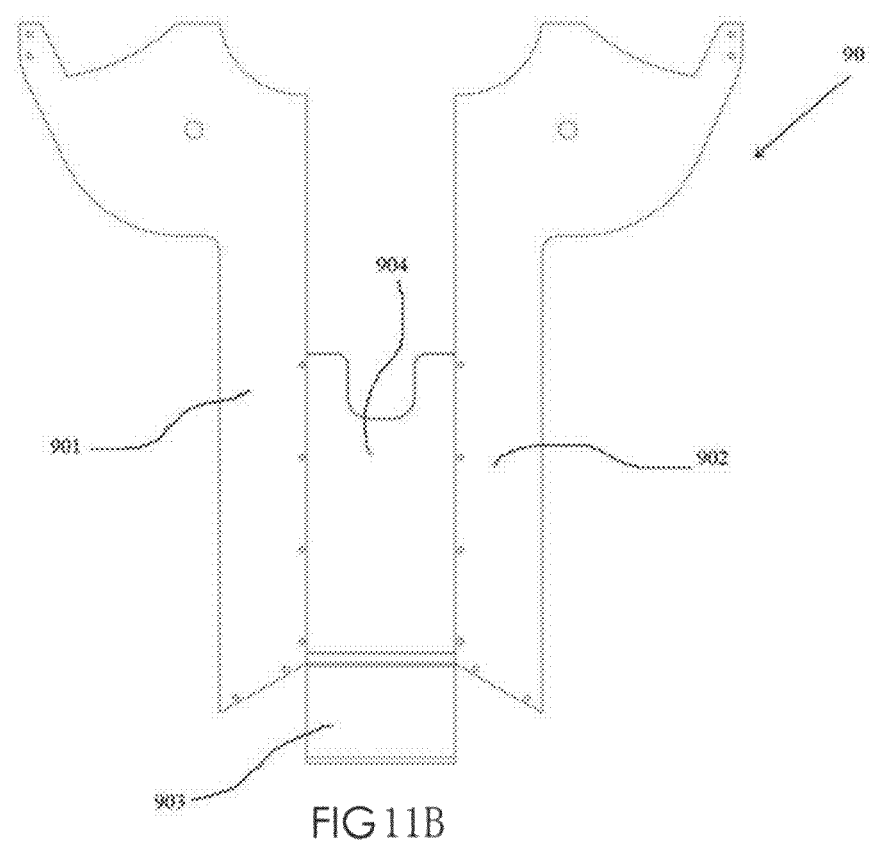
FIG. 11B is an exploded view of the main body assembly according to another embodiment.

As shown in FIG. 11B, main body assembly 90 can be a one-piece flat plate cut out into a predetermined shape. The one-piece flat plate may include first side portion 901, second side portion 902, front portion 903, and central portion 904. First side portion 901 and second side portion 902 can be folded to be perpendicular central portion 903. Front portion can be bent back to be perpendicular central portion 903. First side portion 901, second side portion 902, and front portion 903 can be welded together to form the main body assembly 90. Alternatively, first side portion 901, second side portion 902, and front portion 903 can be fixed to central portion 903 with fastener devices (not shown).

Figure 11C:
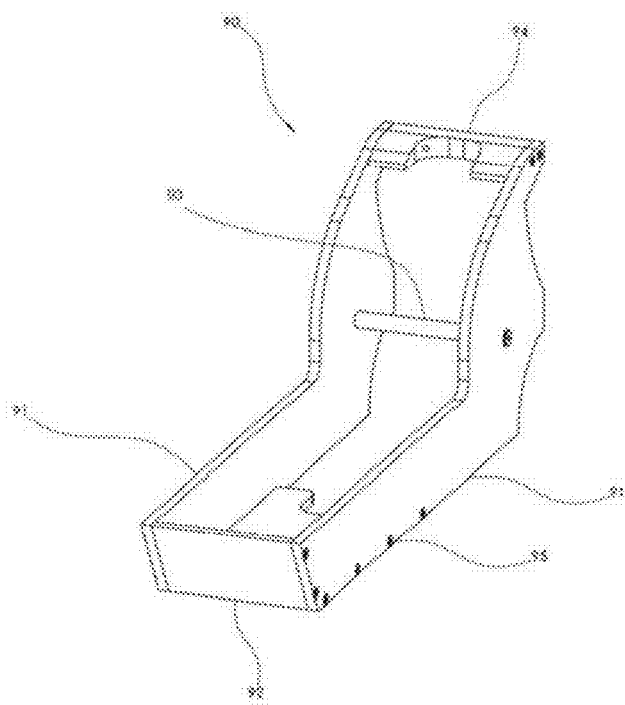
FIG. 11C is a perspective view of the main body assembly which is in an assembled state.

FIG. 11C shows the assembled state of the main body assembly 90.

Figure 12:
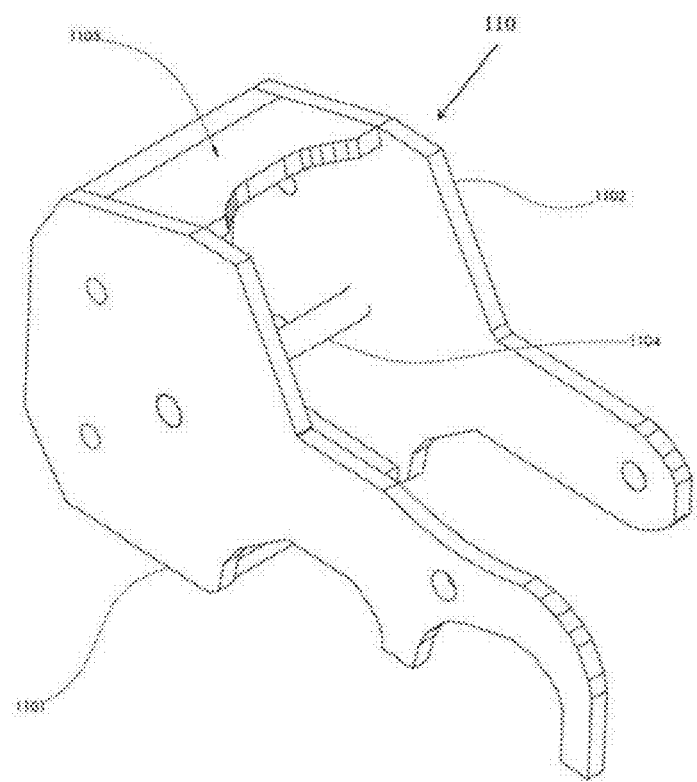
FIG. 12 is a perspective view of the rear fork assembly.

As shown in FIG. 12, rear fork assembly 110 includes first fork plate 1101, second fork plate 1102, intermediate plate 1103, and pivot rod 1104. First fork plate 1101 is used to hold a braking system (not shown). The braking system can be implemented in various forms, such as a disc brake, a mechanical brake, which are described later in this specification.

Figure 13:
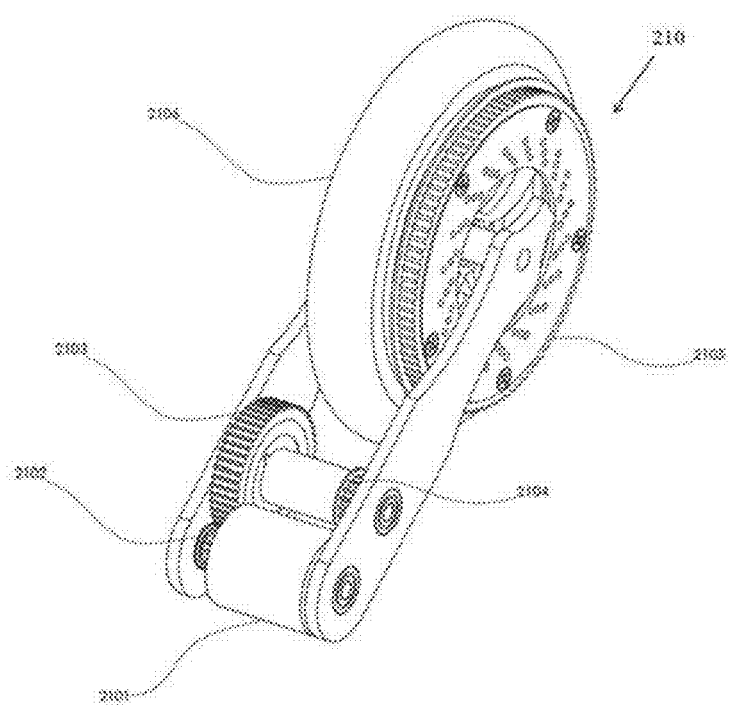
FIG. 13 is a perspective view of the rear drive train assembly.

As shown in FIG. 13, rear drive train assembly 210 includes motor 2101, first sprocket 2102, second sprocket 2103, third sprocket 2104, fourth sprocket 2105, tire 2106. Motor 2101 is connected to first sprocket 2102 through a shaft (not shown). First sprocket 2102 is connected to second sprocket 2103 through a belt (not shown). Second sprocket 2103 is connected to third sprocket 2104 through a shaft (not shown). Third sprocket 2104 is connected to fourth sprocket 2105 through a belt (not shown). The diameter of fourth sprocket 2105 is larger than that of third sprocket 2104. The diameter of second sprocket 2103 is larger than that of first sprocket 2102. In this way, the torque output from motor 2101 is amplified due to the ratio of gears. In a preferred embodiment, the electric scooter has a differential which reduces the gear ratio to 9:1. Thus, when traveling down or inclining, the loss in speed due to the friction can be minimized. This reduction will also produce a higher torque to achieve higher accelerations at these inclines.

Figure 14:
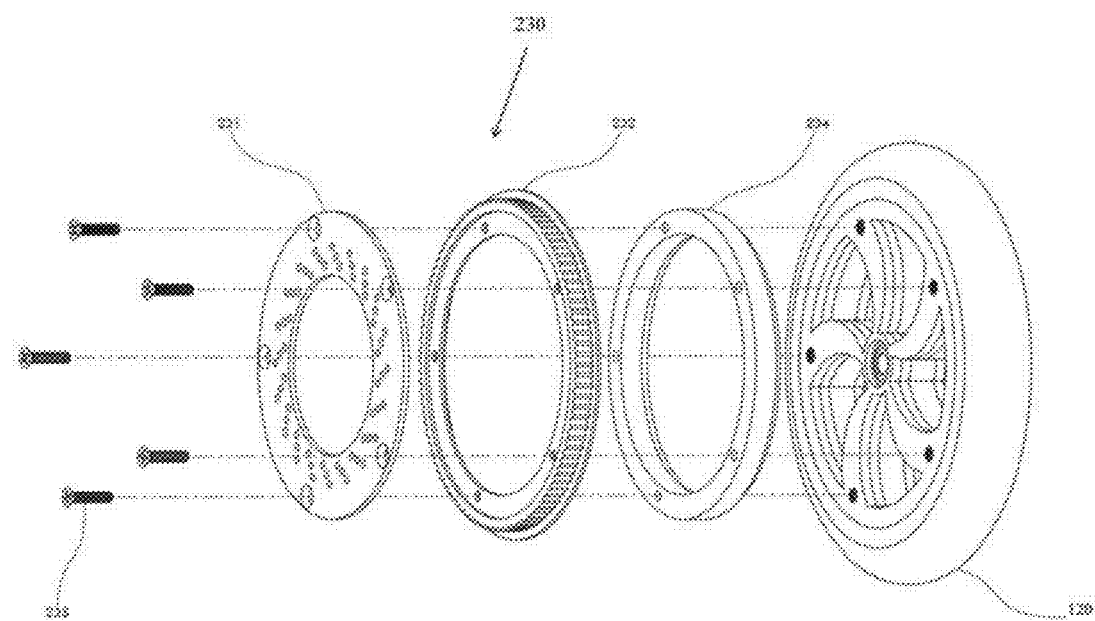
FIG. 14 is an exploded view of the rear sprocket assembly.

FIG. 14 shows rear sprocket assembly 230, which includes disc brake 231, sprocket 232, and spacer 234. Disc brake 231, sprocket 232, spacer 234 are laminated together to attach to rear wheel assembly 120 by screws 235.

Figure 15A:
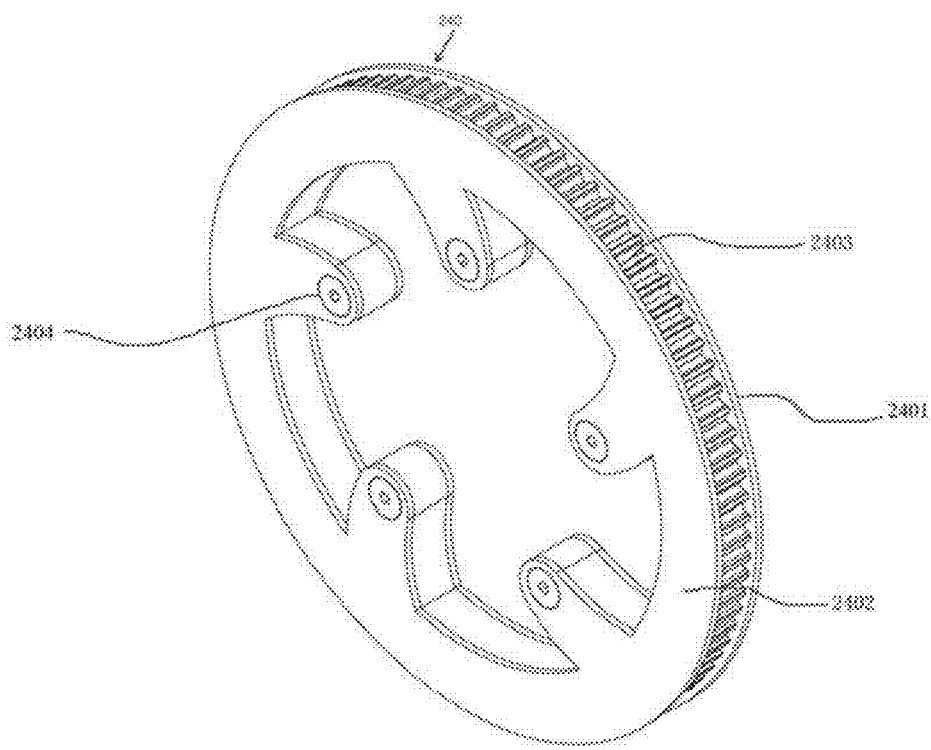
FIG. 15A is a perspective view of the mechanical brake assembly.
Figure 15B:
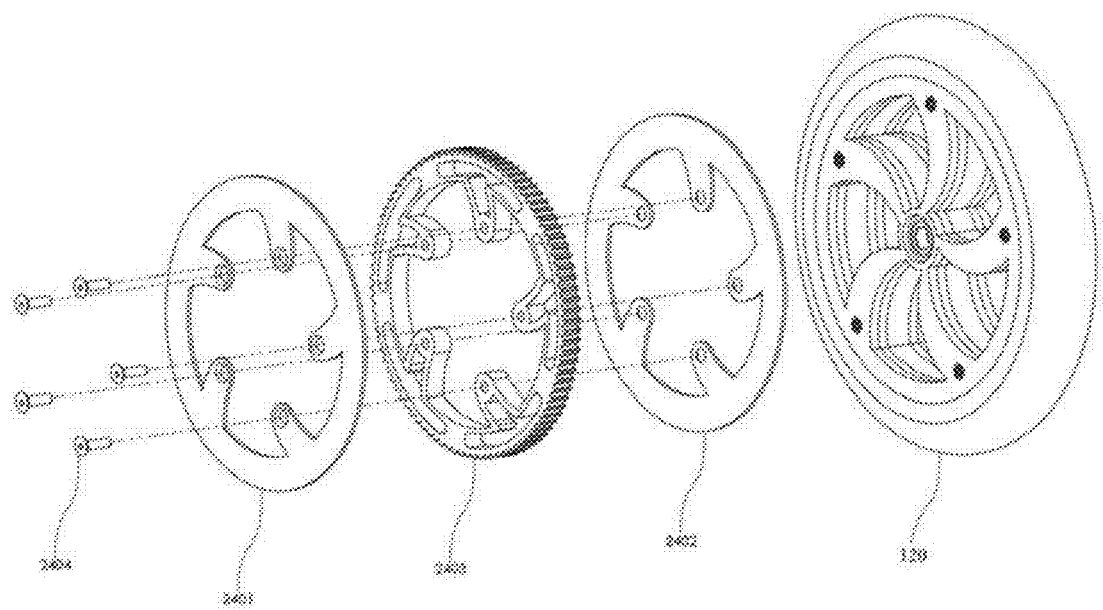
FIG. 15B is an exploded view of the mechanical brake assembly.

FIG. 15A shows mechanical brake assembly 240, which includes first plate 2401, second plate 2402 and sprocket 2403. First plate 2401, second plate 2402 and sprocket 2403 can be assembled together using screws 2404. As shown in FIG. 15B, mechanical brake assembly 240 can be connected to rear wheel assembly 120.

Figure 16:
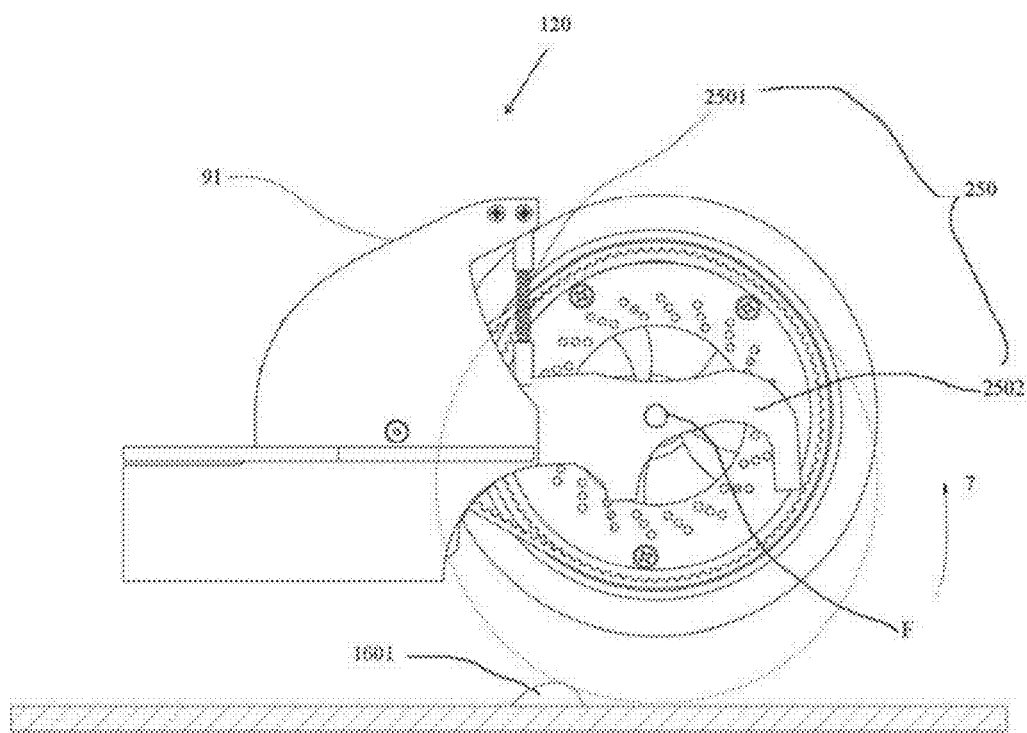
FIG. 16 is a side view of the rear wheel assembly.

FIG. 16 shows how rear suspension system 250 works. Rear suspension system 250 includes spring 2501 and rear fork assembly 2502. There is bump 1601 on the road on which the scooter is traveling. Rear wheel assembly 120 goes up along direction 7 when it hits bump 1601. The original position of rear wheel assembly 120 on the ground is shown in dashed lines. Rear fork assembly 2502 pivots about point F. Meanwhile, spring 2501 is compressed. As such, the roughness caused by hitting a bump is reduced.

The present application also provides a method for manufacturing the foldable electric scooter. The electric scooter can be designed on 3D Solidworks software.

Then, two-dimensional flat plates are processed using a cutting machine, such as Water Jet or Laser cutter. Preferably, 6061 T6 ¼ inch thick aluminum sheet is used.

Parameters of performance of typical Water Jet are listed below:

Cuts aluminum sheet @ 20-50 inches per minute;
Tolerances: ±0.01-0.005;
Ultra-high water pressure: 30,000 to 90,000 psi.

Water jet cutting is a cost efficient method of manufacturing the flat pieces because of the ability to stack three to five ¼ aluminum plates on top of each other while still maintaining our desired tolerance specifications.

Figure 17:
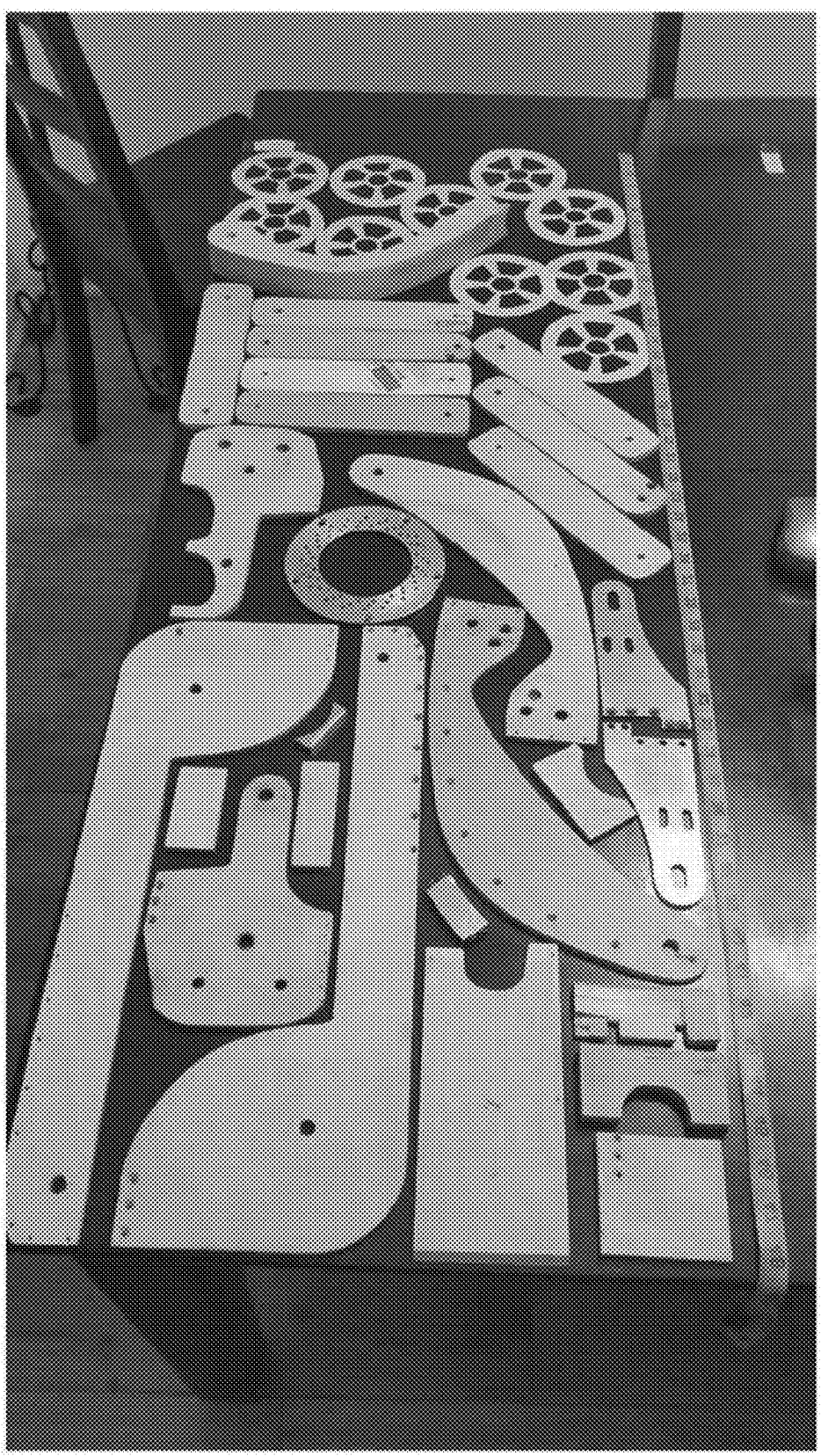
FIG. 17 is a picture showing pieces carved out by a cutting machine.

Two-dimensional scooter parts as shown in FIG. 17 can then be assembled into a three-dimensional electric scooter. This method of manufacturing allows the electric scooter to fold into a significantly smaller package than prior scooters.

Having thus described the disclosure of the present application in detail and by reference to implementations thereof, it will be apparent that modifications and variations are possible without departing from the scope of the disclosure defined in the appended claims.

What is claimed is:
1. A manufacturing method of an electric scooter, comprising:
cutting two-dimensional scooter parts;
assembling the two-dimensional scooter parts into a three-dimensional electric scooter;

wherein the electric scooter includes
a front wheel assembly,
a front fork assembly,
a headset assembly,
a handlebar assembly,
a throttle controller,
a gooseneck assembly,
a main body assembly,
a standing platform,
a drive train assembly,
a rear fork assembly; and
a rear wheel assembly;
wherein
the front wheel assembly is mounted on the front fork assembly;
the front fork assembly is connected to the headset assembly pivotably;
the handlebar assembly is connected to the headset assembly pivotably;
the throttle controller is mounted on the handlebar assembly;
the gooseneck assembly is mounted on the headset assembly;
the main body assembly is connected to the gooseneck assembly;
the standing platform is mounted on the main body assembly;
the rear wheel assembly is connected to the main body assembly;
the drive train assembly is connected to the rear fork assembly;
the rear fork assembly supports the rear wheel assembly;
wherein the handlebar assembly further includes
a first handle,
a second handle,
a first segment, and
a second segment;

wherein
the first segment is sleeved into the second segment, such that the first segment collapses into the second segment;
the first handle is provided on a left side of the handlebar assembly and the second handle is provided on a right side of the handlebar assembly and the first handle and the second handle collapse in a first plane forming a collapsed handlebar assembly;
the collapsed second segment has a central axis and revolves 90 degrees about the central axis, such that the first handle and the second handle are in a second plane which is perpendicular to the first plane; and
the collapsed handlebar assembly pivots sideways towards the gooseneck assembly
wherein the front fork assembly pivots about a first point towards the gooseneck assembly;
the gooseneck assembly further includes a cavity accommodating the front wheel assembly; and
the gooseneck assembly pivots about a second point towards the main body assembly along a first direction.

2. The method of claim 1, wherein material of a wheel spacer plate, an inner wheel plate, and an outer wheel plate is selected from the group consisting of plastic, aluminum, stainless steel, carbon fiber, paper, metal, and ceramics.

3. The method of claim 1, wherein the step of cutting two-dimensional scooter parts is performed by a water jet.

4. The method of claim 1, wherein the step of cutting two-dimensional scooter parts is performed by a Laser cutter.

5. The method of claim 3, wherein the water jet uses an ultra-high water pressure of 30,000 to 90,000 psi.

6. The method of claim 1, wherein two-dimensional scooter parts are nesting in one piece of flat raw material.

7. The method of claim 1, wherein
the rear wheel assembly pivots about a third point towards the main body assembly along a second direction; and
the main body assembly further includes a hollow portion accommodating the rear wheel assembly.

* * * * *